(12) United States Patent
Ball et al.

(10) Patent No.: US 8,539,337 B2
(45) Date of Patent: Sep. 17, 2013

(54) INTERNET SERVICES AND METHODS THEREOF

(75) Inventors: Jonathan Ball, Ontario (CA); Mihnea Galeteanu, Ontario (CA); Giselle Jean-Baptiste, Ontario (CA); Elijah El-Haddad, Ontario (CA); Han Xu, Ontario (CA); Jennifer Baldwin, British Columbia (CA); Evgueni Kharlamov, British Columbia (CA)

(73) Assignee: International Business Machines Corporation, Armonk, NY (US)

( * ) Notice: Subject to any disclaimer, the term of this patent is extended or adjusted under 35 U.S.C. 154(b) by 1200 days.

(21) Appl. No.: 12/035,384

(22) Filed: Feb. 21, 2008

(65) Prior Publication Data

US 2009/0217155 A1 Aug. 27, 2009

(51) Int. Cl.
*G06F 17/00* (2006.01)

(52) U.S. Cl.
USPC ........... 715/234; 715/235; 715/236; 715/273; 717/115; 717/116; 717/124

(58) Field of Classification Search
USPC ................. 715/204, 243, 273, 234, 235, 236; 717/115, 124, 116
See application file for complete search history.

(56) References Cited

U.S. PATENT DOCUMENTS

| | | | | |
|---|---|---|---|---|
| 7,167,903 | B2 * | 1/2007 | Percival | 709/217 |
| 7,599,935 | B2 * | 10/2009 | La Rotonda et al. | 1/1 |
| 7,805,400 | B2 * | 9/2010 | Teh et al. | 707/600 |
| 7,958,117 | B2 * | 6/2011 | Pettinati et al. | 707/732 |
| 8,150,939 | B1 * | 4/2012 | Murray | 709/217 |
| 8,302,020 | B2 * | 10/2012 | Louch et al. | 715/764 |
| 8,413,044 | B2 * | 4/2013 | Mao | 715/234 |
| 2002/0101448 | A1 * | 8/2002 | Sanderson | 345/762 |
| 2004/0148307 | A1 * | 7/2004 | Rempell | 707/102 |
| 2006/0235935 | A1 * | 10/2006 | Ng | 709/208 |
| 2007/0124460 | A1 * | 5/2007 | McMullen et al. | 709/224 |
| 2008/0229218 | A1 * | 9/2008 | Maeng | 715/760 |
| 2008/0235601 | A1 * | 9/2008 | Fried et al. | 715/760 |
| 2009/0204886 | A1 * | 8/2009 | Xu et al. | 715/234 |
| 2010/0079462 | A1 * | 4/2010 | Breeds et al. | 345/440 |
| 2011/0314396 | A1 * | 12/2011 | Diab et al. | 715/760 |

OTHER PUBLICATIONS

Apple Developer Connection, 'Dynamic Forms with DHTML', Published 2004, pp. 1-10.*

* cited by examiner

*Primary Examiner* — Stephen Hong
*Assistant Examiner* — Matthew Ludwig
(74) *Attorney, Agent, or Firm* — Novak Druce Connolly Bove + Quigg LLP

(57) ABSTRACT

A system that incorporates teachings of the present disclosure may include, for example, a computer-readable storage medium operating in a web server having computer instructions for receiving from an Internet browser a request to create a viewing profile for a web page, creating the viewing profile by generating an asynchronous script for processing at least a portion of data supplied by a web service, embedding the asynchronous script in the web page, and presenting at the Internet browser the updated web page with the embedded asynchronous script. Additional embodiments are disclosed.

20 Claims, 3 Drawing Sheets

100

200

INTERNET SERVICES AND METHODS THEREOF

FIELD OF THE DISCLOSURE

The present disclosure relates generally to Internet applications, and more specifically to Internet services and methods thereof.

BACKGROUND

The Internet browser has become a common tool for users to explore Internet services. To improve the experience for Internet users, some web applications embed an asynchronous script in the web page to selectively refresh portions of the browser's display. This technique prevents the need to refresh an entire web page when a small change is required. Embedded asynchronous scripts are however static and generally are not customizable by the browser's user.

Developers of web applications and web pages typically utilize disparate software development tools which makes testing interactions between a web application and its corresponding web page challenging.

DETAILED DESCRIPTION

In one embodiment of the present disclosure, a computer-readable storage medium operating in a web server can have computer instructions for receiving from an Internet browser a request to create a viewing profile for a web page, creating the viewing profile by generating an asynchronous script for processing at least a portion of data supplied by a web service, embedding the asynchronous script in the web page, and presenting at the Internet browser the updated web page with the embedded asynchronous script.

In one embodiment of the present disclosure, a computer-readable storage medium operating in at least a portion of an Internet browser can have computer instructions for presenting a web page supplied by a web server, wherein the web page comprises an embedded asynchronous script for processing data supplied by the web server according to one among a plurality of selectable viewing profiles of the web page, detecting a selection of one of the plurality of selectable viewing profiles, submitting the request to the web server, and presenting an updated web page supplied by the web server responsive to the web server modifying the embedded asynchronous script according to the new viewing profile.

In one embodiment of the present disclosure, a method can involve creating a web service, creating a web page with an embedded asynchronous script that is adaptable to more than one viewing profile, and presenting viewable interactions between the web service and the web page for testing purposes.

Figure 1:
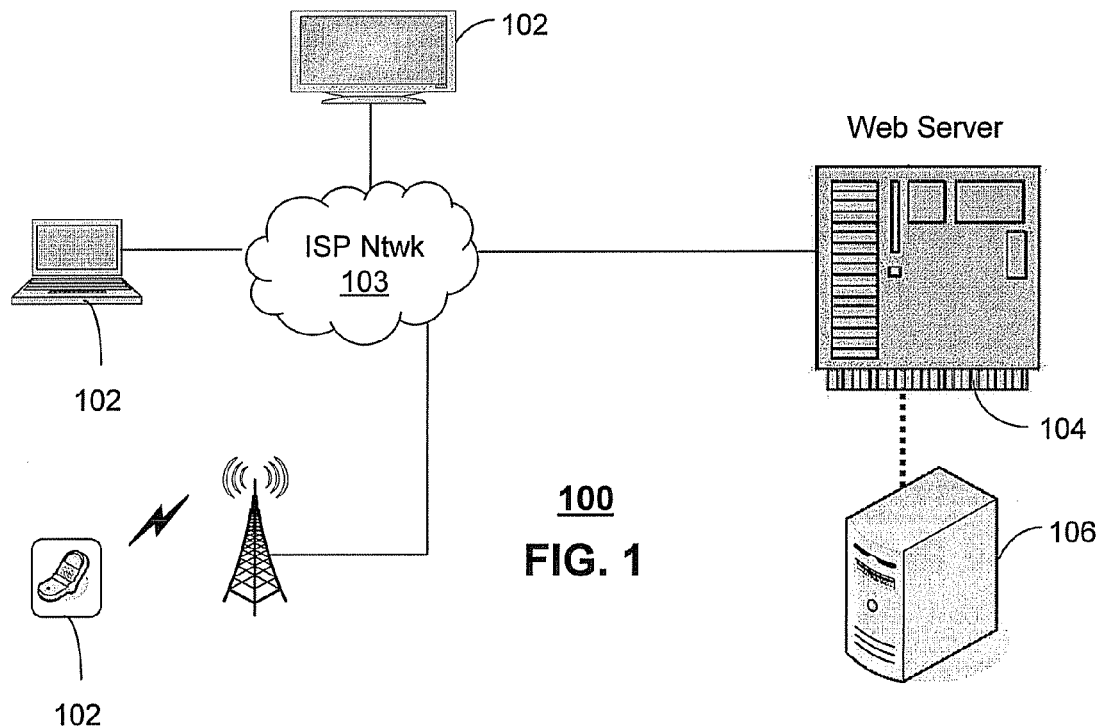
FIG. 1 depicts an exemplary embodiment of a communication system.

FIG. 1 depicts an exemplary embodiment of a communication system 100. The communication system 100 can comprise a common web server 104 that provides web services to one or more media devices 102 (such as a cell phone, computer, television and so on) by way of an Internet Service Provider (ISP) network 103. The media devices 102 can make use of the web services by way of a Internet browser such as Microsoft's Internet Explorer and other common browsers.

Figure 2:
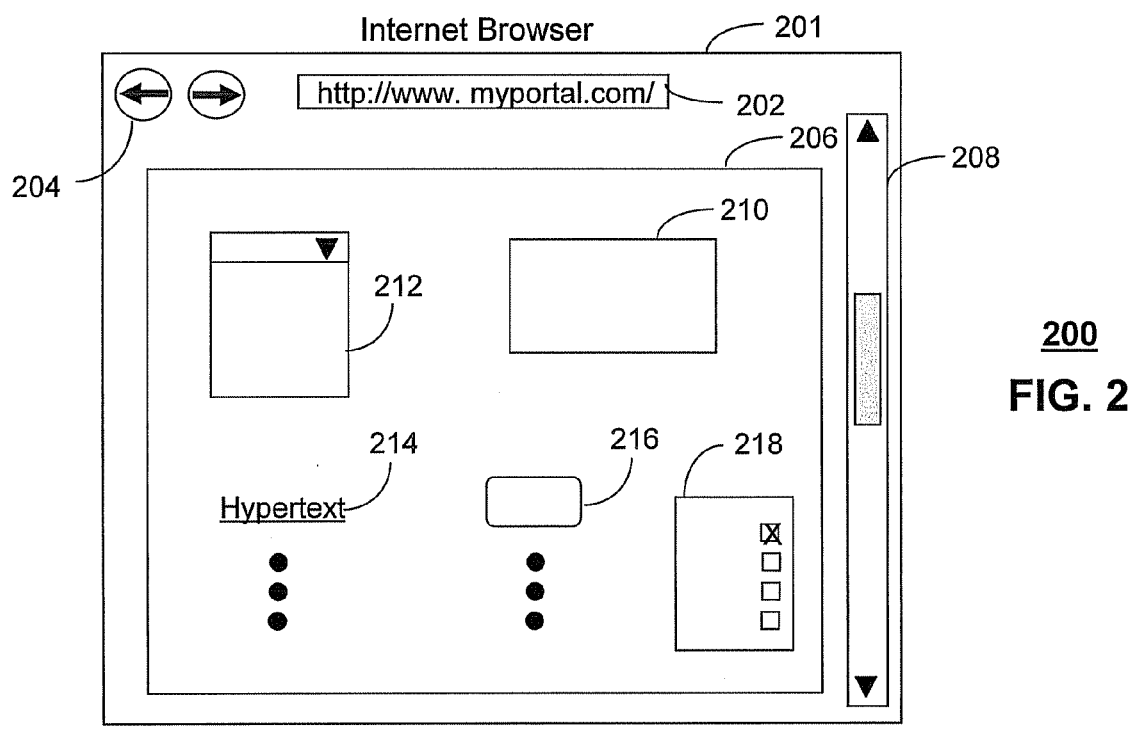
FIG. 2 depicts an exemplary Internet browser.

FIG. 2 depicts an exemplary Graphical User Interface (GUI) for a common Internet browser 201. The Internet browser 201 can have an addressing field 202 for entering Uniform Resource Locators (URLs) which can be used to selectively point to desired web pages. The Internet browser can also provide left and right buttons 204 for switching between web pages 206. The web pages 206 can be scrolled up or down with a common scroll bar 208. A portion 210 of a viewing area of the web page 206 can be controlled by an embedded asynchronous script such as a JavaScript programming language or an eXtensible Markup Language (XML) script (or when combined AJAX scripts). The web page 206 can also provide other selectable GUI elements such as a drop-down menu 212, hypertext 214, selectable buttons 216 and so forth. The web page 206 can be developed with a HyperText Markup Language (HTML). The asynchronous script can interact with a web application supplying the web page, process data therefrom, and present it without having to refresh the entire viewing area of the web page 206.

Figure 3:
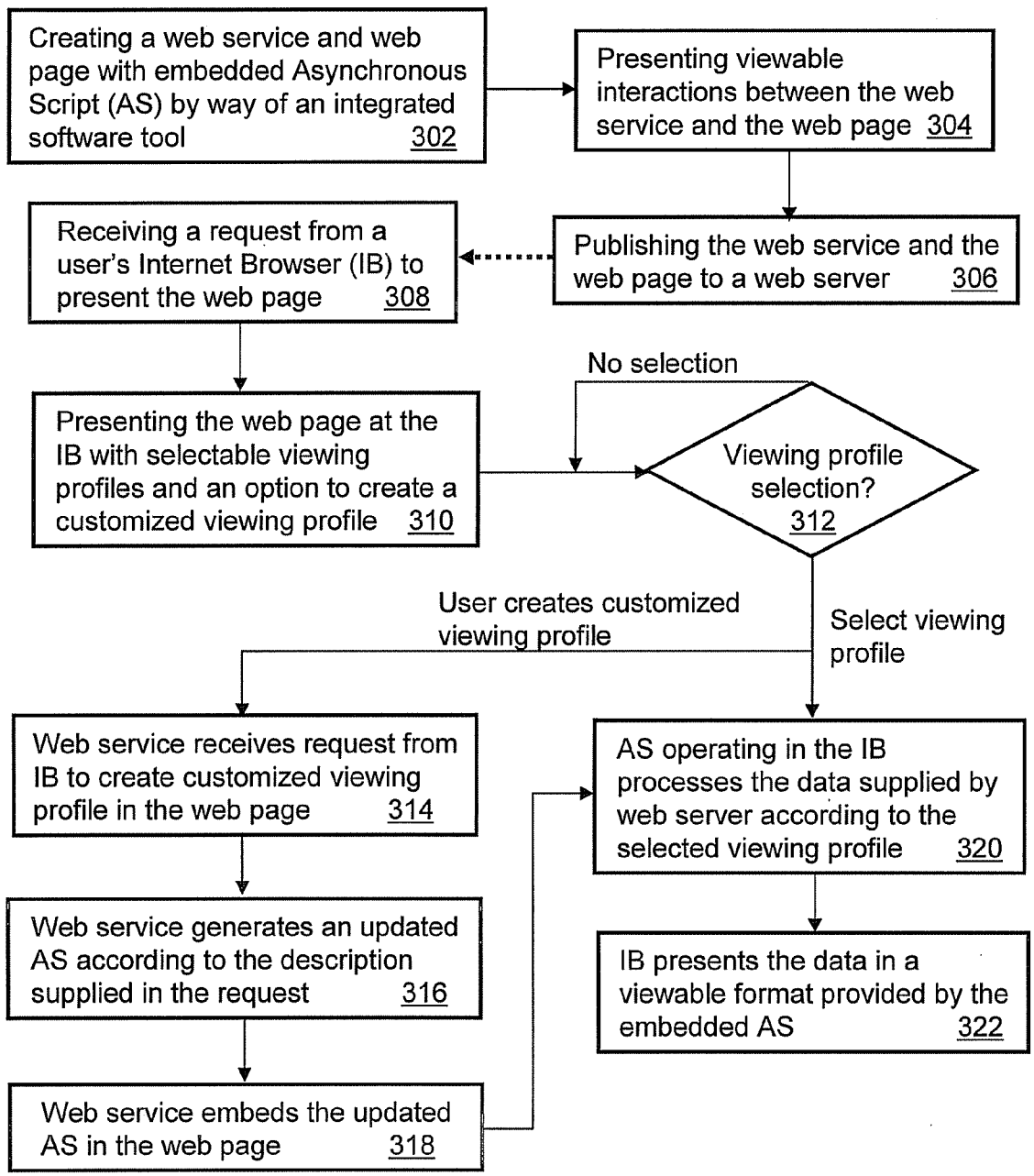
FIG. 3 depicts an exemplary method operating in portions of the communication system.

The service provider of the web services can develop web services and corresponding web pages utilizing an integrated software tool that operates in a common computing system 106 as shown in FIG. 1. FIG. 3 depicts an exemplary method 300 operating in portions of the communication system 100 that illustrate an integrated development process for web services and corresponding web pages, and an illustration of the services in operation. It should be noted that steps 302-306 can be performed independent of the operation steps 308-322. The integration of steps 302-306 in FIG. 3 is for convenience and illustration purposes only.

With this in mind, method 300 can begin from step 302 where the service provider utilizes the computing system 106 of FIG. 1 to develop a desired web service and corresponding web pages. The development process takes place through an integrated software tool that can provide a mechanism to incrementally develop the web service and corresponding web page(s). The integrated software tool has several development components: a component for developing web services, a component for developing corresponding web page(s) with embedded asynchronous scripts that provide one or more selectable viewing profiles, and a debugging tool for viewing interactions between the web service and web page(s) in a simulated environment.

A selectable viewable profile in the present context can mean a viewing format in the web page which is selectable by a user of the Internet browser. For example, suppose the web service can provide financial information. A user can be provided in the web page a drop down menu of selectable viewing profiles or one or more GUI elements (such as buttons) each representing a viewing profile which the user can select to indicate a desired viewing format for the financial data. For instance, the user could select a viewing profile for presenting the financial data with histograms. In another embodiment, the user can select a viewing profile to display the financial data on the basis of time, value, and so on. In yet another embodiment, the user can select a viewing profile that superimposes averages over a histogram or line graphs. Once a viewing profile has been selected by the user, the Internet browser can invoke a portion of the embedded asynchronous script to consistently process data supplied by the web service according to the selected profile.

The developer can also present options on the web page so that users can create custom viewing profiles. In one embodiment, for example, the web page 206 can be designed so that it presents a user by way of the Internet browser 201 an input data form 218 to describe a desired viewing profile. The form can present a number of building blocks for a viewing profile with check boxes next to each sub-element. The user can then select the desired elements by checking the boxes of interest, and when finished selecting a GUI button such as "Finished" or "Submit" to indicate the viewing profile has been completed. When such a selection is made, the web page 206 can be designed to construct a request by way of the Internet browser with a description of the desired viewing profile. The request can then be submitted to the web service for processing.

To support custom viewing profiles, the developer can design the web service so that it can update the embedded asynchronous script in the web page with the new viewing profile. The asynchronous script generated for the new viewing profile can replace all or a portion of the asynchronous script previously embedded in the web page. The updated web page can show the new viewing profile as an addition to a drop-down menu, a new GUI button, or hypertext—just to mention a few possibilities. Moreover, the updated web page can present the new viewing profile as the selected profile. Accordingly, the user can immediately view data supplied by the web service processed according to the customized viewing profile.

The dynamic nature of custom viewing profiles can be tested by the developer with the same integrated software tool used to create the web service and corresponding web page. In step 304 the debugging component of the integrated software tool can be used to debug incremental development of the web service and web page(s) as well as their behavior when custom viewing profiles are requested. The debugging component can present viewable interactions between the web service and web page(s) under a test environment in which one or more Internet browsers interact with the web page(s). The debugging portion of the integrated software tool can also provide the developer other common debugging features such as code tracing, breakpoints, buffer snapshots, and so on.

Once the web service and web page(s) have been developed and tested by the integrated tool and thereby in a state for commercial deployment, method 300 can proceed to step 306 where the web service and web page(s) are published on the web server 104 of FIG. 1 for public consumption. Commercial consumption begins with step 308 where a user submits to the web server 104 by way of an Internet browser a request for access to a select web page. The request can be made by entering a URL in addressing field 202 of the user's Internet browser, or by searching for the web service with a search tool such as provided by Google, and then selecting hypertext that redirects the Internet browser to the requested web page. Responsive to the request, the web service presents in step 310 the web page at the Internet browser with the embedded asynchronous script operating under for example a default viewing profile.

If in step 312 the user does not change the viewing profile, the Internet browser 201 continues to process data from the web service according the default profile. If on the other hand the user selects a different viewing profile from for example a drop-down menu 212, the embedded asynchronous script is triggered in step 320 to process and present in step 322 data from the web service according to the selected viewing profile. In yet another embodiment, the user can choose to create a customized viewing profile by defining it according to a set of building blocks (e.g., using check boxes—see reference 218). In this instance, the embedded asynchronous script of the browser can be programmed to generate a request that describes the custom viewing profile. The request is then submitted in step 314 to the web server 104 by common Internet communication means. The web server 104 can respond by enabling a custom viewing profile generator for generating custom viewing profiles in step 316.

The custom viewing profile generator can be a common software application operating in the web server 104 which is capable of generating asynchronous scripts that can be embedded in the web page from which the request was made. The custom viewing profile generator can for example validate that parameters associated with the check boxes 218 selected by the user in step 312 to define the custom viewing profile are logically feasible and a corresponding asynchronous script can be generated that effectuates the user's request. If the parameters are valid, the web server 104 proceeds to step 316 where it generates an updated asynchronous script which in whole or in part modifies or replaces in step 318 the existing embedded asynchronous script operating in the web page 206.

Once the asynchronous script has been modified, the web page 206 presented at the Internet browser 201 is updated and can begin in step 320 to process and present data from the web services in step 322 according to the customized viewing profile if it is set in the web page as the default profile. Otherwise, the web page 206 can present the customized viewing profile from the drop-down menu 212 which the user can select in step 312 as previously described to process data supplied by the web services according to the newly generated custom viewing profile. The portion of the updated asynchronous script associated with the new custom viewing profile updates a portion of the viewing area of the web page 206 without having to refresh the entire viewing area of the web page.

From the foregoing descriptions, it would be evident to an artisan with ordinary skill in the art that the aforementioned embodiments can be modified, reduced, or enhanced without departing from the scope and spirit of the claims described below. Accordingly, the reader is directed to the claims for a fuller understanding of the breadth and scope of the present disclosure.

Figure 4:
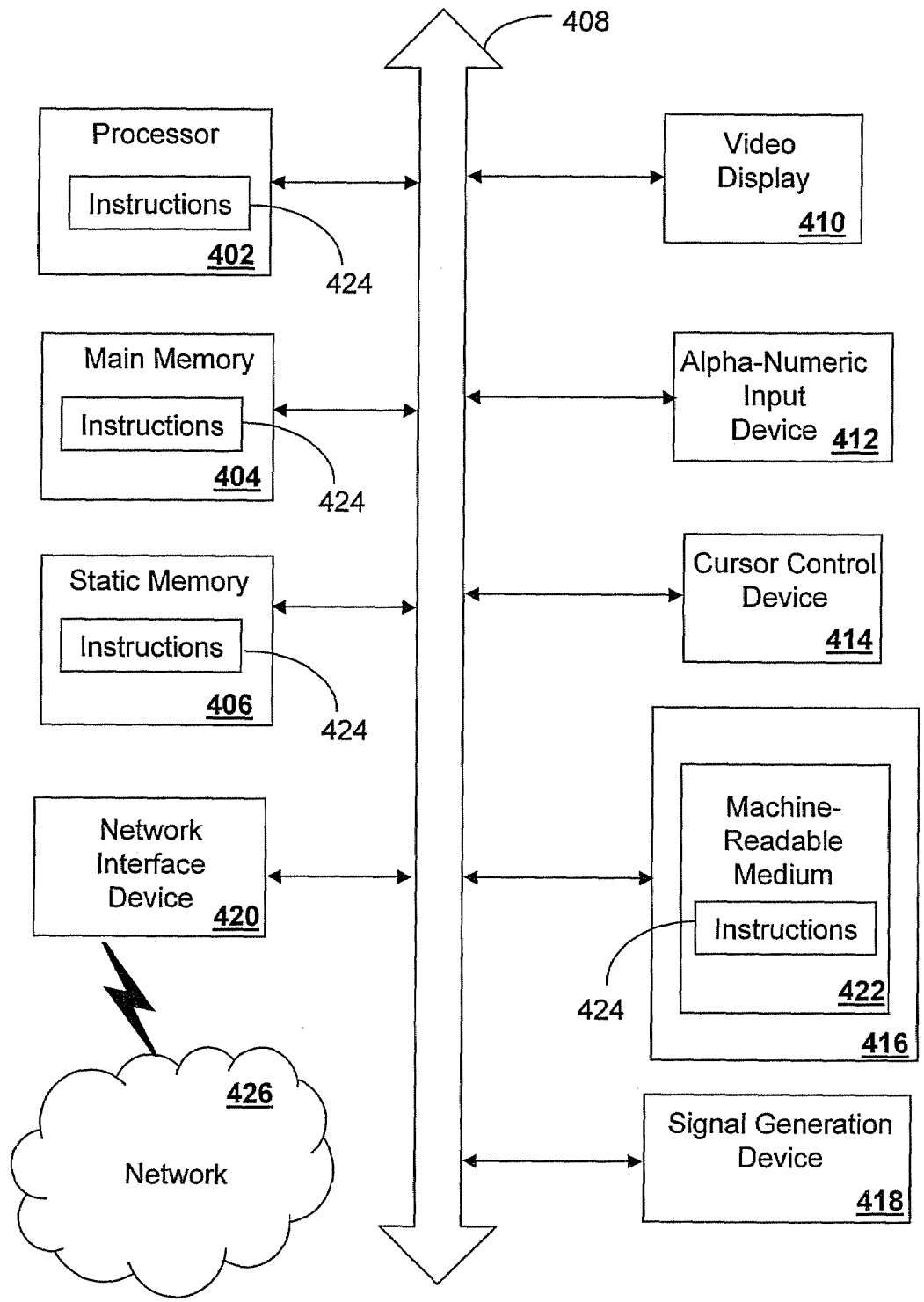
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium operating in a web server, having embodied therewith computer instructions for:
   presenting at an Internet browser an existing web page presenting data supplied by the web server, the web page identifying a plurality of selectable building blocks for requesting a different presentation of a portion of the data supplied by the web server and comprising an embedded asynchronous script for providing the presentation of the portion of the data, the different presentation comprising at least a different format for arranging and presenting the portion of the data;
   receiving from the Internet browser a request to create a new viewing profile for the existing web page, the new viewing profile comprising a selection of at least a portion of the plurality of selectable building blocks;
   creating the new viewing profile by generating a first asynchronous script for providing the different presentation of the portion of the data supplied by web server in accordance with the new viewing profile;
   based on the first asynchronous script, updating the embedded asynchronous script in the existing web page to yield an updated web page with the different presentation of the portion of the data; and
   presenting at the Internet browser the updated web page with the different presentation of the portion of the data, wherein the presenting is performed without requiring the Internet browser to engage in a refresh operation using the web server.

2. The storage medium of claim 1, wherein the existing web page comprises a HyperText Markup Language (HTML) web page.

3. The storage medium of claim 2, wherein the embedded asynchronous script in the HTML page comprises a second asynchronous script for providing a presentation of the portion the data supplied by the web service according to any of a plurality of selectable viewing profiles in the HTML page, wherein the updating step further comprises updating in the HTML page the plurality of selectable viewing profiles to include the requested viewing profile and updating the second asynchronous script based on the first asynchronous script to yield the updated embedded asynchronous script such that the updated web page is presented according to the updated embedded asynchronous script and the updated plurality of selectable viewing profiles.

4. The storage medium of claim 3, wherein the request comprises a description of the requested viewing profile.

5. The storage medium of claim 4, wherein the description comprises at least one among a request to combine two or more of the plurality of selectable viewing profiles, a request to update at least one among the plurality of selectable viewing profiles, and a request to create the requested viewing profile from one or more viewing logic parameters.

6. The storage medium of claim 2, wherein during the presenting, the embedded asynchronous script dynamically modifies a viewing portion of the HTML page without refreshing an entire viewing area of the HTML page.

7. The storage medium of claim 6, wherein the embedded asynchronous script comprises at least one among an object-oriented programming language script and an eXtensible Markup Language (XML) script.

8. The storage medium of claim 7, wherein the object-oriented programming language script corresponds to a JavaScript.

9. The storage medium of claim 6, wherein the embedded asynchronous script comprises an Asynchronous JavaScript and XML (AJAX) script.

10. A non-transitory computer-readable storage medium operating in at least a portion of an Internet browser, having embodied therewith computer instructions for:
    presenting an existing web page presenting data supplied by a web server, wherein the existing web page comprises an embedded asynchronous script for providing a presentation of at least a portion of the data supplied by the web server according to one among a plurality of selectable viewing profiles of the web page;
    detecting a request comprising a selection of at least one of the plurality of selectable viewing profiles to yield a new viewing profile specifying a different presentation of the portion of the data, the different presentation comprising at least a different format for arranging and presenting the portion of the data;
    submitting the request to the web server; and
    presenting an updated web page supplied by the web server responsive to the web server modifying the embedded asynchronous script in the web page according to the new viewing profile to yield an updated asynchronous script providing the different presentation of the portion of the data according to the new viewing profile, wherein the presenting is performed without requiring the Internet browser to engage in a refresh operation using the web server.

11. The storage medium of claim 10, wherein the web page comprises a HyperText Markup Language (HTML) web page.

12. The storage medium of claim 11, wherein the updated asynchronous script dynamically modifies a viewing portion of the HTML page without refreshing an entire viewing area of the HTML page.

13. The storage medium of claim 12, wherein the updated asynchronous script comprises at least one among an object-oriented programming language script and an eXtensible Markup Language (XML) script, and wherein the object-oriented programming language script corresponds to a JavaScript, and wherein the asynchronous script comprises an Asynchronous JavaScript and XML (AJAX) script.

14. The storage medium of claim 10, wherein the request comprises a description of the selected viewing profile.

15. The storage medium of claim 14, wherein the description comprises at least one among a request to combine two or more of the plurality of selectable viewing profiles, a request to update at least one among the plurality of selectable viewing profiles, and a request to create the requested viewing profile from one or more viewing logic parameters.

16. A method, comprising:
    creating a web service;
    configuring the web service to deliver to at an Internet browser a web page presenting data supplied by the web service, the web page having an embedded asynchronous script for presenting at least a portion of data for the web page according to one or more pre-defined viewing profiles, the web page comprising at least one selection element for allowing a new viewing profile to be defined at the Internet browser to provide a different presentation of the portion of the data, the different presentation comprising at least a different format for arranging and presenting the portion of the data, and the web page being configured for interacting with the web service to update the embedded asynchronous script in the web page so as to integrate the new viewing profile into the pre-defined viewing profiles and provide the different presentation of the portion of the data without requiring the Internet browser to engage in a refresh operation with the web service; and presenting viewable interactions between the web service and the web page for testing purposes.

17. The method of claim 16, comprising:

publishing the web service and the web page to a web server; and the web server updating the web page with an adapted embedded asynchronous script responsive to receiving from an Internet browser a request a new viewing profile.

18. The method of claim 17, wherein the request comprises a description of the new viewing profile, and wherein the description comprises at least one among a request to combine two or more of the plurality of selectable viewing profiles, a request to update at least one among the plurality of selectable viewing profiles, and a request to create the requested viewing profile from one or more viewing logic parameters.

19. The method of claim 16, wherein the asynchronous script comprises at least one among JavaScript and an eXtensible Markup Language (XML) script.

20. The method of claim 16, wherein the method corresponds to a non-transitory computer-readable storage medium for creating and testing interactions between the web service and the web page.

* * * * *